Patented Mar. 13, 1934

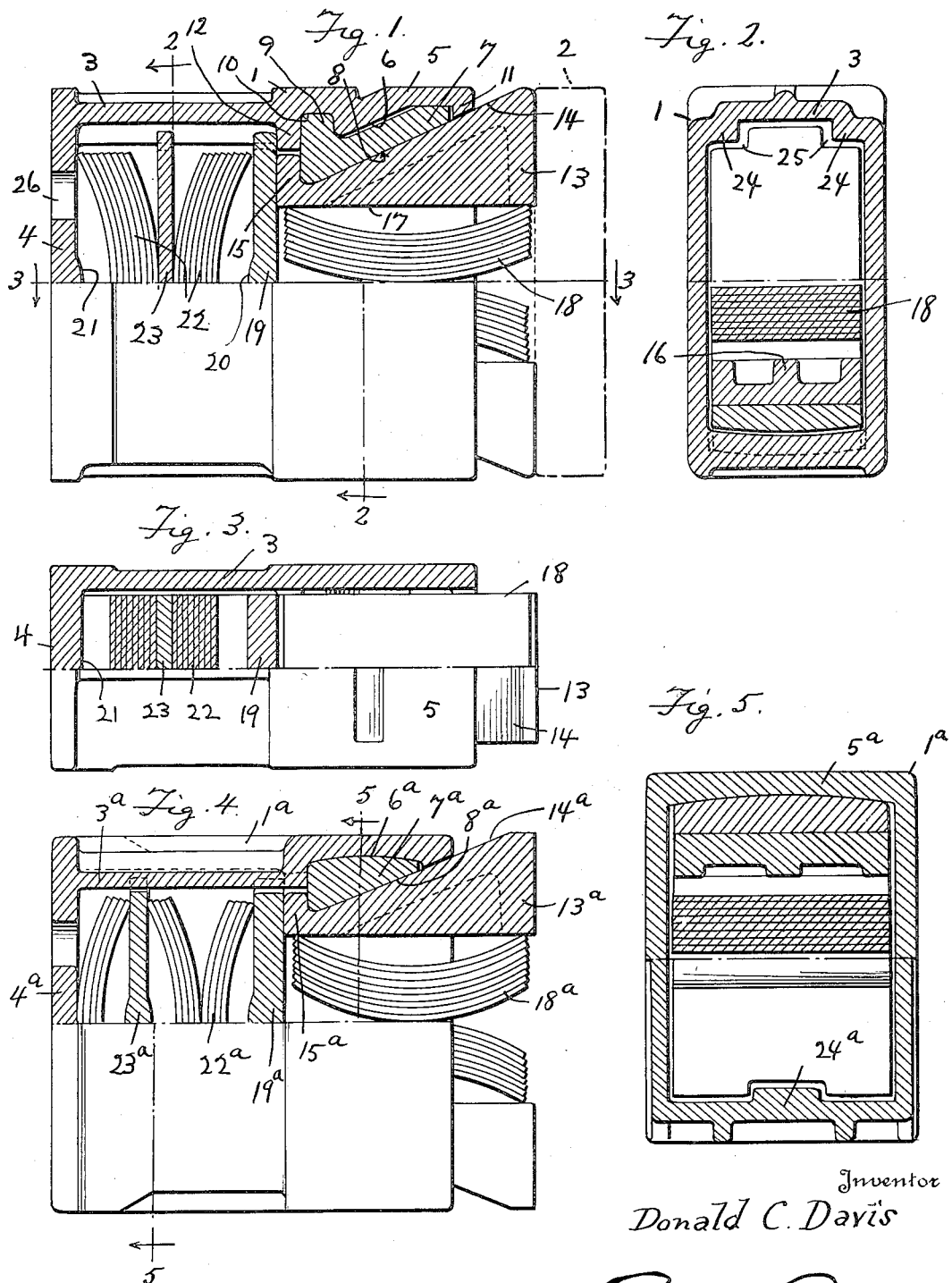

1,951,086

UNITED STATES PATENT OFFICE 1,951,086

CUSHIONING MECHANISM

Donald C. Davis, Buffalo, N. Y., assignor to The Gould Coupler Company, New York, N. Y., a corporation of Maryland Application May 17, 1927, Serial No. 192,107

11 Claims. (Cl. 213—30)

This invention relates to cushioning mechanism and, more particularly, to friction draft gears adapted for use on railway cars.

The principal object of my invention, generally considered, is to provide a friction draft gear particularly adapted for railway service, said gear comprising a casing or barrel open at one end and provided with pockets receiving removable wedge or wear plates which are adapted to present hardened wear surfaces for engagement with cooperating wedge blocks, resilient means being provided for spreading said wedge blocks as well as for urging the same toward said open end of the casing, said wedge plates being adapted to equalize with respect to the casing and each other.

An object of my invention is the provision of a friction draft gear involving a barrel or casing open at one end, said casing being formed without the usual integral or rigidly connected inclined friction surfaces and, instead, formed with pockets receiving removable wedge or wear plates which are adapted to present such inclined friction surfaces which may be specially hardened, if desired, whereby, not only may the friction surfaces be replaced when worn, but, by reason of the omission of the usual immovable inclined friction surfaces, easy assembly of the interior parts of the gear is permitted.

Another object of my invention is to provide a friction draft gear involving a casing or barrel closed at one end and open at the other, said open end being formed with pockets or depressions in opposite walls thereof, said pockets receiving wedge plates which may be provided with lugs engaging in corresponding recesses to insure a tight fit and hold said plates in proper assembled relation with respect thereto, the inwardly presented surfaces of said plates forming inclined friction surfaces for engagement with cooperating friction elements of the gear.

A further object of my invention is to provide a cushioning mechanism adapted for use with railway draft rigging and involving a casing or barrel open at one end and closed at the other, opposite walls of said casing, adjacent said open end, being formed with inwardly opening pockets and wedge plates formed with inclined friction surfaces seated in said pockets, the bottoms of said wedge plates and the corresponding seats in the walls of the casing being made approximately cylindrical or spherical to permit squaring adjustment or equalization of the plates with respect to said casing.

A still further object of my invention is the provision of a friction draft gear formed with a casing or barrel open at one end and closed at the other, said closed end being formed with guide walls at sides thereof and containing resilient means, preferably in the form of plate springs, and a follower engaging the outermost of said springs, said follower being formed to cooperate with the guide walls and extend beyond the same and the resilient means being held in position by said guide walls, whereby slippage off said follower cannot occur.

Other objects and advantages of the invention relating to the particular arrangement and construction of the various parts will become apparent as the description proceeds.

Referring to the drawing illustrating my invention, the scope whereof is defined by the appended claims:

Figure 1 is a side elevation, partly in vertical longitudinal section, of one embodiment of my invention.

Figure 2 is a transverse sectional view on the line 2—2 of Figure 1 looking in the direction of the arrows.

Figure 3 is a plan of the same embodiment of my invention shown partly in horizontal section on the line 3—3 of Figure 1.

Figure 4 is a view corresponding to Figure 1 but showing another embodiment of my invention.

Figure 5 is a transverse sectional view on the line 5—5 of Figure 4 looking in the direction of the arrows.

Referring to the drawing in detail, like parts being designated by like reference characters, and first considering the embodiment of my invention illustrated in Figures 1, 2 and 3, there is shown a cushioning mechanism 1 particularly adapted for use with railway draft rigging and designed so that it will fit into a draft gear pocket of a desired size. In the present embodiment, the gear is shown relatively narrow although it may be made wider, if desired, as illustrated in Figures 4 and 5. Said gear is adapted to cooperate with a follower 2, illustrated diagrammatically by dot and dash lines, and may be employed with any usual form of draft rigging as desired. For example, said gear may be employed with the usual type of Farlow attachments embodying a horizontal yoke, a front follower, a key for supporting said front follower and connecting it to the draft sills and another key serving for connecting the yoke to the coupler. The aforementioned parts, in addition to the draft gear and rear follower, are not shown because they are parts of a well known form of draft rigging with which my gear may be used although, it will be understood that said gear is not limited to use with such forms of draft rigging.

The embodiment of my cushioning mechanism illustrated in Figures 1, 2 and 3 comprises a casing or housing 3 desirably closed at one end by a wall 4, which end, in the present embodiment, is illustrated as the front end although, as is obvious, my gear is adapted to be used turned end to end if desired. It will also be apparent that the mechanism associated with the open end may be duplicated at the other end giving a barrel with two open ends as an alternative. The open end of the barrel or casing 3 has, formed in a pair of opposite walls 5 thereof, pockets or depressions 6 normally receiving removable wedge or wear plates 7, the inner surfaces 8 of which may be hardened and inclined and take the place of the usual integral or fixed inclined friction surfaces of such gears. On account of having the wedge plates 7 removable, the same may be replaced when worn and, when removed from position, the opening into the barrel 3 is unusually large thereby permitting easier assembly of the parts of the gear adjacent the closed end 4 thereof.

In the present embodiment, the wedge plates 7 are formed with tapering lugs or heel portions 9 engaging in corresponding inner recesses 10 in the walls 5 of the barrel to insure a tight fit and hold the same in proper assembled relation with respect to said barrel. It will be apparent, however, that, if desired, the recesses may be formed large enough to provide for preliminary movement of the wedge plates with respect thereto, whereby additional gear travel may be provided. The other or outer ends of the wear plates 7 form toe portions normally nesting in corresponding outer recesses, or portions of the pockets 6, in the walls 5 of the barrel. Between the inner and outer recesses, the walls 5 are preferably formed with tapered lug portions normally nesting between the heel and toe portions of the wear plates 7. The bottoms of the wedge plates or surfaces engaging the walls 5 of the barrel may be made curved or substantially cylindrical or spherical to permit squaring adjustment between said plates and the barrel and formed with pockets receiving the corresponding tapered lug portions forming shoulders adapted to engage the lugs 9 on the wedge plates. In the present embodiment, said surfaces are shown substantially cylindrical, whereby the wedge plates may equalize transversely of the barrel so that the friction surfaces 8 thereof may be squared with respect to the barrel when in service. In order to preserve the generally rectangular section of the casing, the curvature of each wedge plate engaging surface is relatively slight so that the centers of curvature of said surfaces are not coincident, the center of each being disposed on the opposite side of the center line of the casing of that of the other. This also avoids departing to any great extent from uniform wall thickness. The recesses 6 in the casing may be defined, at their outer extremities, by lips or ribs 11 and, at their inner extremities, by ribs or flanges 12.

Cooperating with the wedge plates 7 are wedge blocks 13 which may be of the usual form with friction surfaces 14 inclined to correspond with the inclination of the friction surfaces 8 on the wear plates 7. The inner ends of said wedge blocks 13 may be provided with outwardly extending flanges 15 interlocking with the inner ends of the wear plates 7 to limit outward movement of said wedge blocks. Said blocks may be formed of hollow construction as illustrated and provided with a central longitudinal stiffening rib 16.

The inner surfaces 17 of said wedge blocks 13, when the parts of the gear are in normal position, may be substantially parallel with respect to each other and resilient means 18 are normally positioned therebetween for spreading said wedge blocks and urging the same into engagement with the friction surfaces on the wear plates 7. Said resilient means 18 preferably comprises curved plate springs arranged in two groups with the concave sides of said groups disposed outwardly in engagement with the inner surfaces 17 of the wedge blocks 13. Although said resilient means 18 is illustrated in the form of curved plate springs, I do not wish to be limited to such construction as resilient means of any appropriate form may be employed.

The inner surfaces of the flanges 15 of the wedge blocks 13 and the ribs 12 of the casing 3 are normally flush or alined, as illustrated particularly in Figure 1, and normally engaging said surfaces is a follower 19, the outer surface or that engaging the wedge blocks 13 being preferably flat or plane and the opposite surface of which may be formed with a slightly convex embossment 20 corresponding to the embossment 21 on the inner surface of the rear wall 4 of the casing, whereby the inward movement of said follower 19 is limited and the resilient means 22 engaging the same is prevented from being stressed beyond a predetermined amount. In the present embodiment, said resilient means is shown in the form of two groups of curved plate springs with an intermediate follower 23 therebetween, said plate springs 22 being disposed with their convex sides abutting the intermediate follower 23.

In order to limit the transverse movement of the leaf or plate springs 22, the rear interior of the barrel or casing 3 may be formed with guiding means or walls 24 preferably positioned at the four corners of the barrel and the followers 19 and 23 are preferably correspondingly notched at the corners thereof as indicated at 25. The plate springs 22, however, are preferably shorter than the followers 19 and 23 and are not notched at their corners so that they engage the guide walls 24 and are prevented, even under the most extreme conditions, from slipping off the follower 19 and are substantially centrally positioned with respect to both followers. If desired, the rear wall 4 of the casing may be formed with one or more apertures 26 which may serve for conveniently inspecting the springs 22 in the barrel.

Referring now to the embodiment of my invention illustrated in Figures 4 and 5, a gear 1$^a$ is there shown which is quite similar to that of the first embodiment except that it is shown wider, as illustrated in Figure 5, than said other gear and the wedge plates 7$^a$ are shown without lugs and merely received in pockets 6$^a$ in opposite walls 5$^a$ of the barrel or casing 3$^a$. The surfaces on the wedge plates 7$^a$ which engage the corresponding surfaces of the pockets 6$^a$ are cooperatively curved and preferably spherical so that a limited amount of angling between said wedge plates 7$^a$ and the housing 3$^a$ is permitted, whereby the friction surfaces 8$^a$ on said wedge plates may adjust themselves to the angularity corresponding with the inclination of the friction surfaces 14$^a$ on the wedge blocks 13$^a$.

As in the preceding embodiment, said wedge blocks 13ª may be provided with engaging flanges 15ª and the inner ends thereof may be engaged by a follower 19ª, the inwardly presented surfaces, at the same time, being engaged by resilient means 18ª which may correspond with that of the first embodiment. Although the resilient means 22ª of the present embodiment may correspond with that of the first embodiment yet it is shown as involving three rather than two sets of curved plate springs 22ª, the outermost of said sets engaging the follower 19ª, the second engaging the outer surface of an intermediate follower 23ª and the last engaging the inner surface of the rear wall 4ª and the inner surface of the intermediate follower 23ª. In the present embodiment, although corresponding guiding walls may be provided for the plate springs 22ª, yet the guide walls 24ª are shown centrally disposed rather than at the corners of the casing as in the first embodiment. Except as specifically described in connection with the present embodiment, the construction of the same may correspond substantially with that of the first embodiment.

From the foregoing description taken in connection with the accompanying drawing, it is thought that the operation of the gear will be obvious as the same corresponds with that of well known forms of gear. It will be apparent that, by my improvements, I have provided a gear which is adapted to have a much longer life because of the provision for replacing the hardened wedge or wear plates and said gear may be very conveniently assembled because, on removal of said plates, the opening for receiving the innermost resilient means is abnormally large. Although both the innermost resilient means 22 and 22ª, as well as the resilient means 18 and 18ª between the wedge blocks 13 and 13ª, respectively, are shown as curved plate springs, I do not wish to be limited to such construction as resilient or spring means of other forms may be provided, if desired. It will also be noted that, in accordance with the embodiment of my invention illustrated in Figures 1, 2 and 3, transverse adjustment of the wedge plates is permitted and, in accordance with the other embodiment of my invention, universal adjustment thereof is permitted, that is, not only are the wear plates adapted to adjust themselves transversely of the mechanism, but they are also adapted to adjust themselves longitudinally thereof so that the angularity of the friction surfaces thereon may correspond with that of the friction surfaces on the wedge blocks. In both embodiments, these adjustment features are quite attractive because it has been difficult in the past to make steel draft gear barrels so that the wedge blocks would have a uniform bearing across the friction faces thereon.

Having now described my invention, I claim:

1. Cushioning mechanism adapted for use with railway draft rigging comprising a casing generally rectangular in section closed at one end and open at the other, said open end being provided with inwardly opening recesses in oppositely disposed walls thereof and formed with surfaces curved longitudinally and transversely of the casing, removable wedge plates seated in said recesses in engagement with said curved surfaces for limited longitudinal and transverse equalizing movement with respect to the casing and providing replaceable hardened inclined wear surfaces, wedge blocks with correspondingly inclined surfaces engaging said wear surfaces, and resilient means disposed between said wedge blocks to press the same against said wear surfaces.

2. Cushioning mechanism adapted for use with railway draft rigging comprising a casing generally rectangular in section closed at one end and open at the other, said open end being provided with inwardly opening inner and outer oppositely disposed recesses in walls thereof, removable wedge plates with heel and toe portions respectively seated in said inner and outer recesses and providing replaceable inclined friction surfaces, the bottoms of said wedge plates and the corresponding recesses in one wall of the casing being substantially circular in outline about a different center from those in the other wall to permit equalizing movement of said wedge plates and avoid great differences in wall thickness, wedge blocks provided with correspondingly inclined surfaces engaging said friction surfaces, and resilient means disposed between said wedge blocks to press the same against said friction surfaces.

3. Cushioning mechanism adapted for use with railway draft rigging comprising a casing closed at one end and open at the other, said open end being provided with inclined friction surfaces, wedge blocks with correspondingly inclined surfaces engaging said friction surfaces, resilient means disposed between said wedge blocks to urge the same against said friction surfaces, a follower positioned inwardly of said wedge blocks, and resilient means disposed between said follower and the closed end of said casing for urging said wedge blocks outwardly thereof, the interior of said casing, adjacent said closed end, being provided with guide walls to limit lateral movement of the resilient means therein, said follower extending beyond and notched to receive said guide walls so that said resilient means cannot become unduly displaced with respect thereto.

4. Cushioning mechanism suitable for use with railway draft rigging comprising a housing, the outline of a section of which is generally rectangular, open at one end and provided with a recess in the inner surface of a wall thereof, a wedge plate seated in said recess and providing a replaceable inclined friction surface, the engaging surfaces on the recessed portion of the housing and the wedge plate being coaxially curved, with the axis disposed beyond the axis of the housing, a tapered lug portion extending from the recessed portion of the housing wall and nesting in said plate, a wedge block with a correspondingly inclined friction surface engaging the friction surface on the plate, and resilient means urging said wedge block against said friction surface.

5. Cushioning mechanism suitable for use with railway draft rigging comprising a housing generally rectangular in section open at one end and provided with recesses, in the inner surfaces of oppositely disposed walls thereof, formed with surfaces curved both ways, removable wedge plates engaging said surfaces for equalizing longitudinally and transversely with respect to said housing and providing replaceable inclined wear surfaces, wedge blocks with correspondingly inclined surfaces engaging said wear surfaces and curved spring plates disposed between said wedge blocks to press the same against said wear surfaces.

6. Cushioning mechanism suitable for use for railway draft rigging comprising a housing generally rectangular in section closed at one end and open at the other, said open end being formed with recesses in opposite walls thereof, the bottoms of said recesses being substantially spherical, wedge plates seated in said recesses, formed with corresponding surfaces engaging the bottoms of the recesses for equalizing movement with respect to the housing in all directions and extending toward each other to provide replaceable inclined friction surfaces, wedge blocks with correspondingly inclined surfaces engaging said friction surfaces, curved plate springs disposed between said wedge blocks to press the same against said friction surfaces, a follower disposed inwardly of said wedge blocks and curved plate springs between said follower and the closed end of said casing.

7. Cushioning mechanism suitable for use with railway draft rigging comprising a housing open at one end and formed with inwardly opening inner and outer oppositely disposed recesses in walls thereof, removable wedge plates with heel and toe portions respectively seated in said inner and outer recesses and providing replaceable inclined friction surfaces, said heel portions being tapered and the inner recesses being correspondingly formed to provide for wedging engagement of said plates and housing, the bottoms of said wedge plates and the corresponding recesses in the housing being circular in section to permit equalizing movement of said wedge plates, wedge blocks provided with correspondingly inclined surfaces engaging said friction surfaces and curved plate springs disposed between said wedge blocks to urge the same against said friction surfaces.

8. Cushioning mechanism suitable for use with railway draft rigging comprising a housing open at one end and provided with inclined friction surfaces, wedge blocks with correspondingly inclined surfaces engaging said friction surfaces, curved plate springs disposed between said wedge blocks to urge the same against said friction surfaces, a follower positioned inwardly of said wedge blocks, and curved plate springs normally acting to urge said follower and wedge blocks outwardly of the casing, that portion of said casing, inwardly of said follower, being provided with guiding walls to limit lateral movement of the curved plate springs, said follower extending beyond said guiding walls so that said springs cannot slip off the corresponding sides thereof.

9. Cushioning mechanism suitable for use with railway draft rigging comprising a housing open at one end and formed with recesses in opposite walls thereof, removable wedge plates seated in said recesses, formed with tapered lugs interlocking with said housing, and extending toward each other to provide replaceable inclined friction surfaces, tapered lug portions extending from the recessed portions of said walls and nesting in pockets in said plates outwardly of said tapered lugs, wedge blocks with correspondingly inclined surfaces engaging said friction surfaces, curved plate springs disposed between said wedge blocks to urge the same outwardly against said friction surfaces, said wedge blocks being formed with outwardly disposed flanges on the inner ends thereof engaging the inner surfaces of the wedge plates to limit outward movement of said blocks, a follower positioned inwardly of said wedge blocks and resilient means inwardly of said follower to urge the same and said blocks outwardly of the housing.

10. Cushioning mechanism adapted for use with railway draft rigging comprising a generally rectangular casing closed at one end and open at the other, said open end being provided with outer and inner recesses in opposite walls of said casing and opening toward one another, removable wear plates each comprising portions providing inclined friction surfaces and toe and tapered heel lug portions, said toe portions normally nesting in the outer recesses in said walls and said heel portions normally wedgingly nesting in the inner recesses thereof, said walls being formed with tapered lug portions nesting in the wear plates between said toe and heel portions for retaining the plates in position, wedge blocks with correspondingly inclined surfaces engaging the friction surfaces on the wear plates, and resilient means disposed between said wedge blocks to press the same against said friction surfaces.

11. Cushioning mechanism adapted for use with railway draft rigging comprising a casing defined by walls and open at one end, opposite walls adjacent said open end being provided with longitudinally spaced recesses, removable wear plates each comprising portions providing inclined friction surfaces and toe and tapered heel portions, said toe portions normally nesting in the recesses nearest to said open end and said heel portions normally wedgingly nesting in the recesses farther from said open end, wedge blocks with correspondingly inclined surfaces engaging the friction surfaces on the wear plates, and resilient means cooperating with said wedge blocks.

DONALD C. DAVIS.